Aug. 9, 1955 S. E. MANECKE 2,715,201
MOTOR CONTROL SYSTEM
Filed Nov. 15, 1952
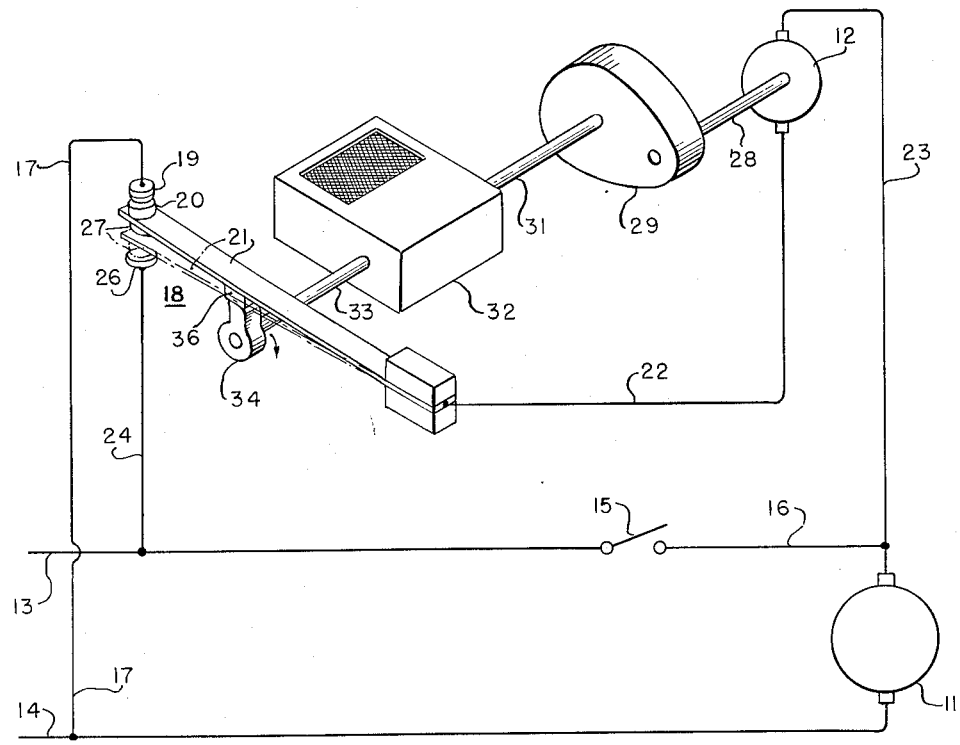
WITNESSES:
INVENTOR
SIEGFRIED E. MANECKE
BY
ATTORNEY United States Patent Office 2,715,201
Patented Aug. 9, 1955

2,715,201

MOTOR CONTROL SYSTEM

Siegfried E. Manecke, Mansfield, Ohio, assignor to Westinghouse Electric Corporation, East Pittsburgh, Pa., a corporation of Pennsylvania Application November 15, 1952, Serial No. 320,651

4 Claims. (Cl. 318—102)

This invention relates to a motor control system and more particularly to a novel system for producing sequential operation of a pair of electric motors. It is an object of the invention to provide an improved system of this kind.

It is a further object of this invention to prolong energization and operation of an auxiliary electric motor following the stopping of a main or primary motor.

The invention contemplates the control of a pair of motors having widely differing impedance characteristics such that when the two motors are connected in series the voltage drop will occur almost entirely across the higher impedance motor, permitting this motor to run while preventing operation of the lower impedance motor.

In practicing this invention, a master switch is employed for controlling energization of the main motor. Switching means cooperating with this master switch is effective upon opening of the master switch to provide a circuit in which the main and auxiliary motors are connected in series. Since the auxiliary motor has a high impedance as compared to the main motor, a substantial portion of the voltage drop is across the auxiliary motor which now operates. The main or low impedance motor is insufficiently energized to effect its rotation. After a period of operation of predetermined duration, the series connection between the motors is interrupted and operation of the auxiliary motor is terminated. The switching means is conditioned for operation each time the main motor is energized through the master switch in order to provide the sequential operation which has just been described. While this invention may be employed in various applications, it is particularly advantageous for use in connection with a domestic clothes dryer or washer wherein the auxiliary motor functions to operate a signaling device at the end of a cycle of operation of the dryer or washer, at which time the main motor is stopped.

These and other objects are effected by the invention as will be apparent from the following description taken in connection with the accompanying drawing, forming a part of this application, in which:

The single figure of the drawing is a schematic diagram of the novel control circuit employed in this invention.

Referring to the drawing, the numbers 11 and 12 designate respectively the main and auxiliary motors which are to be controlled by this invention. The main motor 11 is preferably a relatively low impedance induction motor, and the auxiliary motor 12 is a relatively high impedance, synchronous motor of the type commonly used for driving clocks. The motors 11 and 12 are connected to a source of power defined by line conductors 13 and 14. The line conductor 13 is connected to the line side of a main control or master switch 15, the load side of which is connected to one side of motor 11 by conductor 16. The main conductor 14 is connected directly to the other side of main motor 11.

The auxiliary motor 12 is energized from the source of power by a circuit including conductor 17 connecting line conductor 14 with an auxiliary switching means indicated generally at 18. The auxiliary switching means 18 includes a fixed contact 19 connected to conductor 17 and a movable contact 20 carried on the end of a spring switch blade 21. The circuit for the motor 12 is completed by a conductor 22 connecting switch blade 21 with one side of the auxiliary motor 12 and a conductor 23 connecting the other side of auxiliary motor 12 with conductor 16 between main control switch 15 and main motor 11.

A second supply circuit is provided for the auxiliary motor 12 and includes a conductor 24 connecting main supply line 13 with a fixed contact 26 forming a part of the auxiliary switching means 18. The contact 26 is arranged to be engaged by a movable contact 27 carried on switch blade 21 to complete this circuit to auxiliary motor 12 through conductor 22.

The auxiliary motor 12 is provided with a drive shaft 28 which, through a suitable reduction gear 29, drives a shaft 31 to actuate a signaling device 32 of any known construction. An extension 33 of shaft 31 carries a cam 34 for actuating the auxiliary switching means 18 by engaging and disengaging a block of insulating material 36 carried by the switch blade 21. The operation of the improved motor control system is as follows:

Operation

With the elements of the system in the positions shown in the drawing, all circuits are deenergized and both main motor 11 and auxiliary motor 12 are stopped. The system is placed in operation by the closing of main control switch 15 which energizes main motor 11 from main supply line 13 through conductor 16 and main supply line 14. A circuit is also established from main supply line 13 through main control switch 15, conductors 16 and 23 to auxiliary motor 12, back through conductor 22, switch blade 21, contacts 20 and 19 and conductor 17 to main supply line 14. The position of auxiliary switching means 18 shown in the drawing and in which contacts 19 and 20 are closed will be referred to as the first position or first station of the auxiliary switching means 18. As auxiliary motor 12 rotates, it drives through shaft 28, reduction gear 29, shaft 31 and extension 33 rotating cam 34 in a clockwise direction as indicated by the arrow in the drawing. The auxiliary motor 12 continues to run until cam 34 releases the insulated block 36 carried by switch blade 21, allowing blade 21 to spring downwardly, separating contacts 19 and 20 to break the circuit to motor 12 and make contacts 26 and 27. The cam 34 is preferably so designed as to permit the auxiliary switch means 18 to move from its first position or station to its new or second position or station after a very short period of operation of auxiliary motor 12. The signaling device 32 is likewise so constructed as to emit no signal during this short initial running period of auxiliary motor 12.

With the auxiliary switching means 18 in its second position the auxiliary motor 12 will not run since its supply circuit, comprising conductor 24, contacts 26 and 27, switch blade 21, conductor 22 and conductor 23, is shunted by main control switch 15 which is in its closed position.

The main motor 11 will continue to run and auxiliary motor 12 will remain deenergized until such time as main control switch 15 is moved to its open position. The opening of main control switch 15 may be effected by various means depending upon the type of apparatus to which the control system is applied. For example, the main motor 11 may be the drive motor for an automatic clothes dryer, the operation of which is terminated by some time or thermostatically-controlled device. The control device would in that instance terminate the operation of the appliance by opening the main control switch 15 of the control system herein disclosed. Since this control system may be applied to any number of appliances and because the control devices of these appliances form no part of the present invention, they have not been shown for the sake of brevity.

When control switch 15 is moved to its open position main and auxiliary motors 11 and 12 are placed in series with the main supply lines 13 and 14. This circuit would be traced as follows: From main supply line 13 through conductor 24, contacts 26 and 27, switch blade 21, conductor 22 to auxiliary motor 12, through conductor 23 to main motor 11 and main supply line 14. The auxiliary motor 12, having relatively high impedance as compared to the main motor 11, will absorb substantially all of the voltage drop across main supply lines 14 and 13 and will commence to run. The main motor 11 on the other hand, will stop because of the low voltage impressed thereon and the only current passing through the windings of main motor 11 will be that necessary to supply the high impedance motor 12.

As auxiliary motor 12 runs, it drives signal device 32 causing it to emit some signal which may, if desired, take the form of a musical tune to inform the user of the appliance of the termination of operation of the main motor 11. The auxiliary motor 12 continues to run until cam 34 engages the insulated block 36 to move auxiliary switching means 18 to its first position illustrated in the drawing. The separation of contacts 26 and 27 as switch blade 21 is moved upwardly breaks the circuit to the auxiliary motor 12. As switch blade 21 is moved upwardly, the contacts 19 and 20 are closed conditioning the supply circuit of auxiliary motor 12 for a subsequent operation.

It will be apparent from the foregoing that this invention provides a simple yet effective control system for a pair of motors having different impedance characteristics. It will further be apparent that while the invention has been described in connection with a signaling device for a domestic appliance, it might equally well be applied to any electrical system embodying a pair of motors which are to be sequentially operated.

While the invention is shown in but one form, it will be obvious to those skilled in the art that it is not so limited, but is susceptible of various changes and modifications without departing from the spirit thereof.

What is claimed is:

1. In a motor control system, the combination of a primary motor having relatively low impedance, an auxiliary motor having relatively high impedance, a pair of main conductors constituting a source of power for the motors, a main control switch in one of said main conductors for controlling operation of the primary motor, switching means movable to a first station for connecting said auxiliary motor across the main conductors and in series with said main control switch, said switching means being movable to a second station for connecting said auxiliary motor in shunt across the main control switch and in series with said primary motor and means driven by the auxiliary motor for actuating the switching means alternately to its first and second stations.

2. In a motor control system, the combination of a main motor having relatively low impedance, an auxiliary motor having relatively high impedance, first and second conductors constituting a source of power and connected to the main motor, a control switch connected in said first conductor for controlling operation of the main motor, said auxiliary motor having one terminal thereof connected to said first conductor on the load side of the control switch, a double-throw switch having first and second contacts and a movable switch member alternately engageable with the first and second contacts, said switch member being connected to another terminal of the auxiliary motor, said first contact being connected to said first conductor on the line side of said control switch and said second contact being connected to said second conductor and means driven by the auxiliary motor for actuating the movable switch member alternately into engagement with said first and second contacts.

3. In a motor control system, the combination of a primary motor having relatively low impedance, an auxiliary motor having relatively high impedance, a pair of main conductors constituting a source of power for the motors, a main control switch in one of said main conductors for controlling operation of said primary motor, switching means movable between first and second positions, said switching means when in its second position connecting said auxiliary motor in shunt across the main control switch and in series with said primary motor, means operated by said auxiliary motor for actuating said switching means from its second to its first position after a predetermined period of operation of the auxiliary motor while said switching means is in said second position and means responsive to the closing of said main control switch for actuating said switching means from its first to its second position.

4. In a motor control system, the combination of a primary motor having relatively low impedance, an auxiliary motor having a relatively high impedance, a pair of main conductors adapted for connection to a source of power, a main control switch connected in one of said conductors, means connecting said low impedance motor to said main conductors in series with said main control switch, switching means adjustable to one station for connecting the high impedance motor in parallel with said low impedance motor, said switching means being adjustable to a second station for connecting the high impedance motor in shunt across the main control switch and in series with said low impedance motor, means responsive to closing of the main switch for adjusting the switching means from its first to its second station and means including the high impedance motor for actuating the switching means from its second to its first station in response to opening of the main switch.

References Cited in the file of this patent

UNITED STATES PATENTS 2,604,497    Morrison _____ July 22, 1952